US005209913A

United States Patent [19]

Audeh et al.

[11] Patent Number: 5,209,913

[45] **Date of Patent: * May 11, 1993**

[54] PROCESS FOR THE PRODUCTION OF NATURAL GAS CONDENSATE HAVING A REDUCED AMOUNT OF MERCURY FROM A MERCURY-CONTAINING NATURAL GAS WELLSTREAM

[75] Inventors: Costandi A. Audeh, Princeton, N.J.; Barry E. Hoffman, Duncanville, Tex.; Garry W. Kirker, Washington Township, Bergen County, N.J.

[73] Assignee: Mobil Oil Corporation, Fairfax, Va.

[ * ] Notice: The portion of the term of this patent subsequent to Jul. 14, 2009 has been disclaimed.

[21] Appl. No.: 343,693

[22] Filed: Apr. 27, 1989

[51] Int. Cl.[5] .......... B01D 53/14; C07C 7/17

[52] U.S. Cl. .......... 423/210; 210/914; 423/230; 585/856

[58] Field of Search .......... 423/210, 220, 566.1, 423/232, 233; 210/702, 716, 914; 208/251 R, 252, 246; 585/856, 820

[56] References Cited

U.S. PATENT DOCUMENTS

| | | | |
|---|---|---|---|
| 3,194,629 | 7/1965 | Dreibelbis | 423/210 |
| 3,286,992 | 11/1966 | Armeniades et al. | 423/DIG. 9 |
| 3,814,799 | 6/1974 | Wygash | 423/210 |
| 3,951,844 | 4/1976 | Mago | 423/232 |
| 4,044,098 | 8/1977 | Miller et al. | 423/210 |
| 4,297,330 | 10/1981 | Schlauer et al. | 423/233 |
| 4,430,206 | 2/1984 | Rankel | 208/252 |
| 4,693,731 | 9/1987 | Tarakad et al. | 55/72 |
| 4,695,366 | 9/1987 | Miller et al. | 208/246 |
| 4,709,118 | 11/1987 | Yan | 585/820 |
| 4,880,527 | 11/1989 | Audel | 210/702 |

OTHER PUBLICATIONS

Katz et al., Handbook of Natural Gas Engineering, McGraw Hill, New York, N.Y. 1959, pp. 504–509.

*Primary Examiner*—John Niebling
*Assistant Examiner*—Brian M. Bolam
*Attorney, Agent, or Firm*—Alexander J. McKillop; Charles J. Speciale

[57] ABSTRACT

A process for producing a natural gas condensate having a reduced amount of mercury from a mercury-containing natural gas wellstream, wherein the wellstream is separated into gaseous and liquid fractions. The treatment of the gaseous fraction includes treatment with a carbonate solution which, upon regeneration, yields an acid gas. A portion of the acid gas is mixed with the liquid fraction, the mixture is then filtered, passed over a substance capable of adsorbing hydrogen sulfide, and separated into a stream comprising a natural gas condensate and at least one other stream comprising lower molecular weight hydrocarbons and/or other gases.

22 Claims, 2 Drawing Sheets

WELL STREAM
SEPARATOR(S)
C/S BED
POTASSIUM CARBONATE SOLUTION
DIETHAN-OLAMINE SOLUTION
END USE
REGENERATOR
ACID GAS
COMPRESSOR(S)
LIQUID FRACTION
HEAT EXCHANGER
IN LINE STATIC MIXER
FILTER
Cu(OH)2 /Al2O3 BED
STABILIZER COLUMN
REBOILER
STABILIZED CONDENSATE

PROCESS FOR THE PRODUCTION OF NATURAL GAS CONDENSATE HAVING A REDUCED AMOUNT OF MERCURY FROM A MERCURY-CONTAINING NATURAL GAS WELLSTREAM

BACKGROUND OF THE INVENTION

The present invention is directed to a process for the production of natural gas condensate, and specifically to a process for the production of natural gas condensate having a reduced amount of mercury from a mercury-containing natural gas wellstream.

Natural gas which is produced from a natural gas well is typically separated and purified to provide products for a variety of end uses. The high-pressure mixture produced from the well, i.e. the wellstream, is typically sent to a separator vessel or a series of separator vessels maintained at progressively lower pressures where the wellstream is separated into a gaseous fraction and a liquid fraction.

The gaseous fraction leaving the separator, which may contain the impurities mercury, carbon dioxide and hydrogen sulfide, is sent to a gas treatment and purification plant where, typically, the mercury concentration is reduced to <0.1 micrograms/$m^3$, the $CO_2$ concentration is reduced to the parts per million (ppm) level, and the $H_2S$ to about one (1) ppm.

The liquid fraction is typically preheated, e.g. to about 150° C., and is then sent to a stabilizer column. In the upper section of the stabilizer column, the stream is rectified, i.e., the heavy hydrocarbons are removed from the vapor phase, and in the lower section of the stabilizer column, the liquid stream is stripped of light hydrocarbon components. Complete stabilization can be further enhanced by heating the bottom liquid stream of the stabilizer column in a reboiler. The reboiler supplies additional heat in order to reduce the light hydrocarbon content of the liquid. The stabilizer column produces two streams: a stream which leaves the top of the stabilizer column containing gaseous components, e.g. $CO_2$, $H_2S$, etc., and low molecular weight hydrocarbons, e.g. $C_1$–$C_4$ and a stabilized condensate stream which leaves the bottom of the stabilizer column.

The purification of the gaseous fraction is commonly achieved by passing the gaseous fraction over a bed of activated carbon which has been impregnated with sulfur. In this step, the mercury in the gas reacts with the sulfur and is essentially removed from the gaseous fraction. Typically, the mercury content of the gas can be reduced from about 250 micrograms/$m^3$ or higher to less than about 0.1 micrograms/$m^3$.

The gas leaving the sulfur/carbon bed is then treated with a hot aqueous potassium carbonate solution which has the ability to absorb $CO_2$ and $H_2S$. This step produces two streams, a rich carbonate solution and a natural gas stream having a reduced $CO_2$ and $H_2S$ content. For example, the $CO_2$ content of the gas can be reduced from about 15% to about 0.3% and the $H_2S$ content from about 80 ppm to about 6 ppm.

The rich carbonate solution may then be sent to a regenerator where it is heated to a sufficiently high temperature, e.g. 120° C., in order to expel the $CO_2$ and $H_2S$, permitting the carbonate solution to be recycled. The $CO_2$ and $H_2S$ mixture expelled from the rich carbonate solution is cooled and this stream, known as the "acid gas" stream, is sent for disposal.

The natural gas stream which resulted from treatment with the carbonate solution is further treated in order to reduce the amount of $CO_2$ and $H_2S$ by heating the gas with an aqueous solution of diethanolamine. Diethanolamine has the ability to absorb $CO_2$ and $H_2S$, and can typically reduce the $CO_2$ content from about 0.3% to about 50 ppm, and the $H_2S$ content from about 6 ppm about 1 ppm. The resulting hydrocarbon gas is then generally considered sufficiently pure for industrial or domestic use.

It has been found that the mercury in wellstreams from gas producing wells which contain mercury is partitioned among the gaseous and liquid streams. This mercury is thought to originate from the geologic deposits in which the natural gas is entrapped. It will also be appreciated by those skilled in the art that trace amounts of nickel, vanadium, salt, moisture and sediment are typically present in the liquid fraction treated in accordance with the present invention.

Typical steps for the processing of the liquid fraction of the wellstream do not reduce the amount of mercury in the liquid fraction leaving the separator. For example, a liquid fraction leaving the separator having a mercury content of about 220 μg/kg (ppb) will yield a stabilized condensate containing about 220 μg/kg (ppb). The presence of mercury in a natural gas condensate is undesirable and can cause damage to downstream processing equipment.

Equipment damage may result when mercury accumulates in equipment constructed of various metals, especially aluminum, by forming an amalgam with the metal. For example, in the production of ethylene, cracked natural gas condensate is commonly passed through a heat exchanger constructed of aluminum. Such equipment exists in the section of the ethylene manufacturing facility where ethylene is separated from hydrogen, ethane and other hydrocarbons by chilling. It has been found that mercury tends to amalgamate with the aluminum of which the heat exchanger is constructed, thereby creating the risk of corrosion cracking with potentially catastrophic results.

SUMMARY OF THE INVENTION

The present invention provides for the production of a natural gas condensate having a reduced amount of mercury by directing a portion of the acid gas, which is normally sent for disposal, into the liquid fraction which has left the separator vessel(s) and been preheated. The acid gas and the liquid fraction are mixed, e.g. in an inline static mixer. The mixture is filtered to remove mercuric sulfide and then passed over a substance capable of adsorbing hydrogen sulfide, e.g., a $Cu(OH)_2/Al_2O_3$ bed, to remove additional mercury and hydrogen sulfide. The mixture is then separated to yield a natural gas condensate stream having a reduced amount of mercury and at least one stream of low molecular weight hydrocarbons and/or gases. The present invention reduces the risk of damage to expensive processing equipment, by providing a process for the production of a natural gas condensate having a significantly reduced amount of mercury.

DETAILED DESCRIPTION

The present invention provides a process for the production of a natural gas condensate having a significantly reduced amount of mercury from a mercury-containing natural gas wellstream. The process of the present invention may be practiced by modifying an existing plant used for the separation and purification of a natural gas wellstream. The present invention utilizes a portion of the acid gas stream, which is conventially sent for disposal, a mixer, a filter, and a bed of a substance capable of adsorbing hydrogen sulfide, e.g. $Cu(OH)_2/Al_2O_3$, in order to affect the removal of mercury from the liquid fraction.

Figure 1:
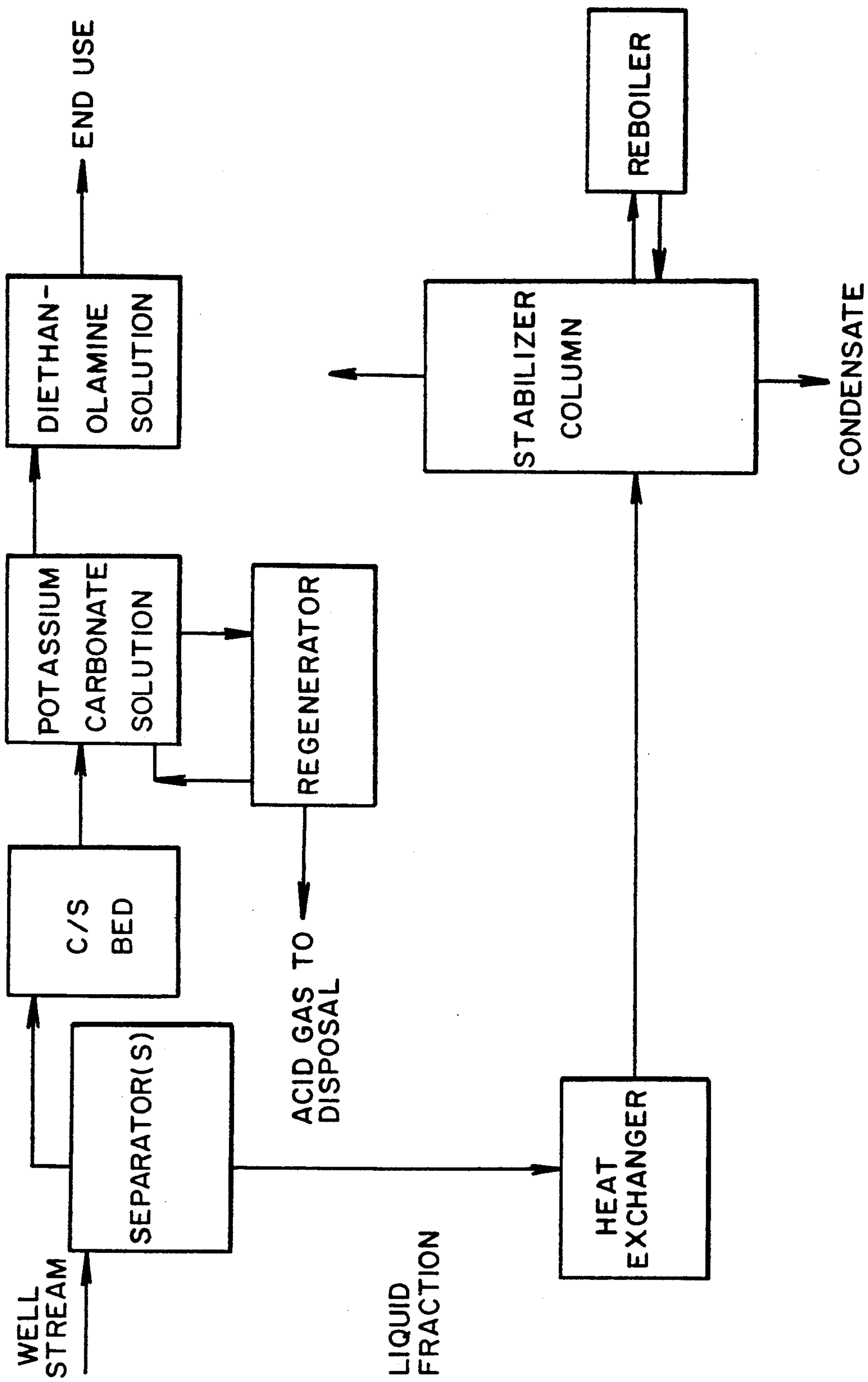
FIG. 1 illustrates a conventional process for the separation and treatment of a wellstream of natural gas into its component parts including the purification of the gaseous fraction.
Figure 2:
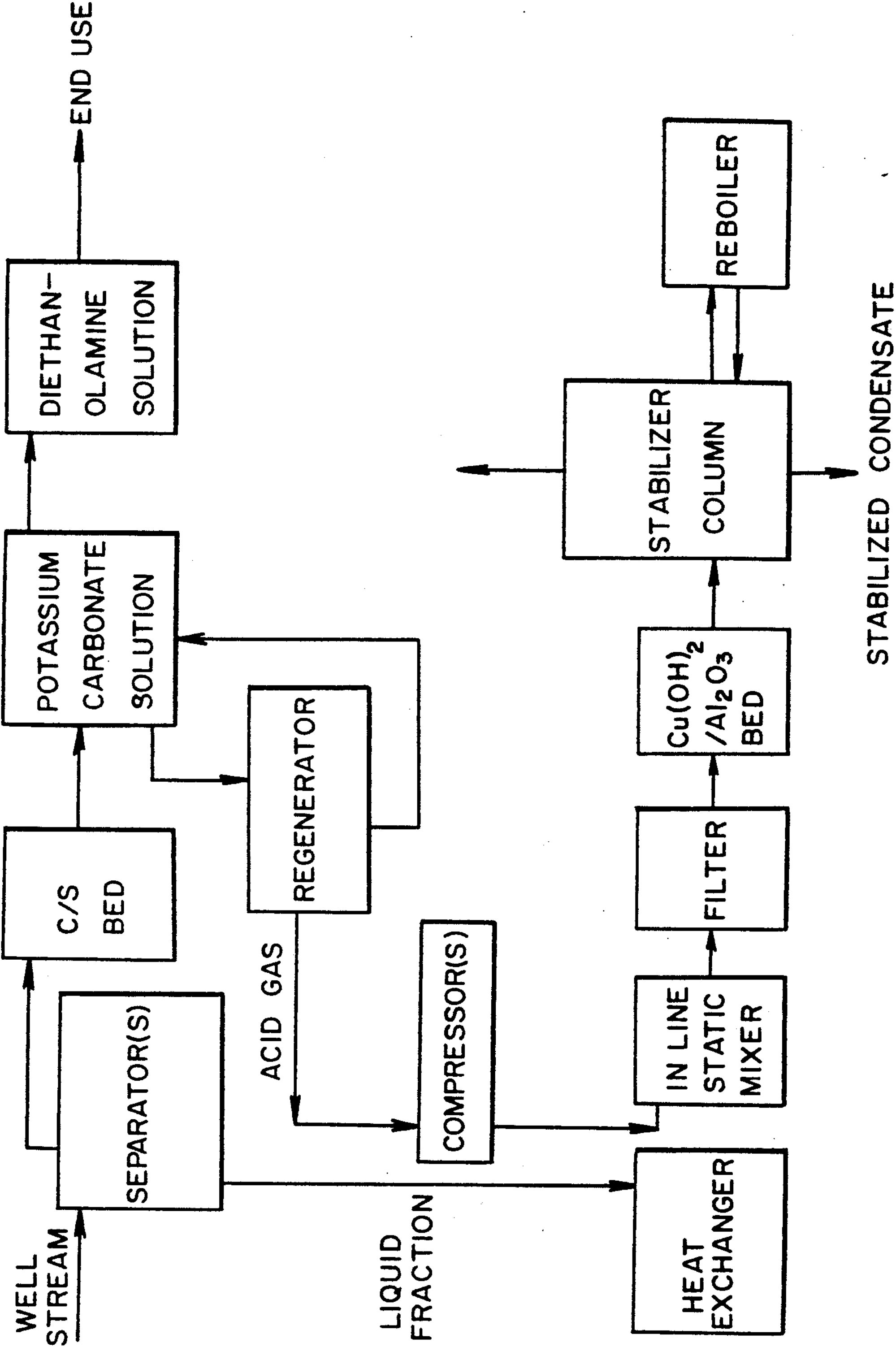
FIG. 2 generally illustrates the improved process of the present invention.

With reference to FIG. 2, in accordance with the present invention, a portion of the acid gas, which, as stated above, contains $CO_2$ and $H_2S$, is mixed into the liquid fraction leaving the separator vessels. The liquid stream may be preheated, for example, to about 150° C., in a heat exchanger. Since the preheated liquid is typically at a higher pressure when it is fed into the stabilizer column, the acid gas may be first sent through one or more compressors in order to increase its pressure so as to exceed the pressure of the preheated liquid fraction. Additionally, in order to ensure adequate contact between the preheated liquid and the acid gas, these two streams are mixed, for example, in an inline static mixer. The mixture is then advantageously filtered to remove the product of the mercury and $H_2S$ reaction.

It is well known that mercury (Hg) will react with $H_2S$ according to the formula:

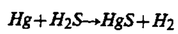

$$Hg+H_2S \rightarrow HgS+H_2$$

The mercuric sulfide forms fine particles which can be filtered, for example, with a filter having holes of about ½ micron. It will be appreciated by those skilled in the art that any filtering technique capable of filtering out the mercuric sulfide will be suitable.

Since the amount of mercury in the liquid fraction, leaving the separator vessels, is much less than the amount of hydrogen sulfide in the acid gas available for the above noted reaction, some hydrogen sulfide gas will remain in the mixture. After filtering, the mixture is, therefore, passed over a substance capable of adsorbing hydrogen sulfide, e.g. a $Cu(OH)_2/Al_2O_3$ bed. In this step, the unreacted $H_2S$ reacts with the copper hydroxide according to the following formula:

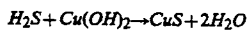

$$H_2S+Cu(OH)_2 \rightarrow CuS+2H_2O$$

Since the $Cu(OH)_2$ is part of a $Cu(OH)_2/Al_2O_3$ bed and since CuS does not dissolve in the mixed stream, the CuS remains entrapped in the alumina. The entrapped CuS provides an additional means by which to remove Hg.

After this step, the relatively $H_2S$-free/Hg-free stream is separated into two streams, e.g., in a stabilizer column as shown in FIG. 2. One stream comprises a natural gas condensate having a reduced amount of mercury and another stream comprises low molecular weight hydrocarbons, e.g. $C_1$–$C_4$, and/or other gases. If a stabilizer column is utilized, in the upper section of the stabilizer column the vapor phase of the mixture is rectified, i.e., the heavy hydrocarbons are removed from the vapor phase and, in the lower section of the stabilizer column, the liquid phase is stripped of light hydrocarbon components.

The amount of acid gas which should be mixed with the liquid fraction leaving the separator vessels will depend upon the hydrogen sulfide content of the acid gas. For an acid gas having a composition of about 97% $CO_2$, 500 ppm $H_2S$, and the balance $CH_4$, the volume of pressurized acid gas should be at least about half of the volume of the liquid fraction and is preferably in the range of about from half to an equal volume of the liquid fraction. It will be appreciated by those skilled in the art that the process of the present invention can be carried out successfully using greater volumes of acid gas relative to liquid fraction.

The $Cu(OH)_2/Al_2O_3$ can be prepared by conventional methods. For example, a mixture of water, $Cu(OH)_2$, and alumina can be extruded through a dieplate of any suitable size, e.g. 1/16 inch, and the extrudate dried. The amount of copper in the bed should be at least about 1 to 30% by weight of the entire weight of the bed and is preferably at least 14% by weight.

The process of the present invention has been successful in reducing the amount of mercury in natural gas condensate from above about 200 ppb to below about 20 ppb. It will be appreciated by those skilled in the art that the mercury content of the natural gas condensate can be determined by conventional methods, such as ASTM method D 3223.

The present invention is further illustrated by the following examples:

Preparation of $Cu(OH)_2/Al_2O_3$ 30 parts of alumina (dry basis) were mixed with 8 parts $Cu(OH)_2$ and 62 parts deionized water. The mixture was thoroughly mixed and the mass was extruded through a 1/16" dieplate. The product was then dried at 125° C. overnight.

EXAMPLE 1

As a control, 1 ml (about 1.2 g) of quartz chips held on a 16 mesh sieve was placed in a steel reactor equipped with a means for temperature control, pressure control, a means for heating, a feed pump, a 0.7 micron stainless steel filter, and a recovery system. A natural gas condensate which contained about 220 μg/kg (ppb) of Hg was introduced into the reactor at 260 psia and at a temperature of 150° C. The flow rate was 20 ml/hour. The product leaving the recovery system was cooled to room temperature and its Hg content was determined at hourly intervals.

Each sample taken over a period of 4 hours, had a Hg content of about 220 μg/kg, therefore, heating the condensate to 150° C. and passing it over quartz chips in a stainless steel reactor did not reduce the Hg content of the condensate.

EXAMPLE 2

This example was essentially a repeat of Example 1, however, in this case, acid gas with the following composition: 97% $CO_2$, 480 ppm $H_2S$, and the balance $CH_4$, was co-fed with the condensate into the reactor used in Example 1, processed under the same process conditions, and recovered with the same recovery system as Example 1. The acid gas/condensate mixture was allowed to flow for 24 hours with samples taken hourly for testing. Samples of the condensate, after separation from the acid gas had a Hg content of <20 μg/kg (ppb).

When tested for hydrogen sulfide, the effluent gas gave a positive result. With lead acetate, black PbS was formed; and with cadmium sulfate, yellow CdS was formed.

EXAMPLE 3

A repeat of Example 2, however, in this case, after the acid gas/condensate mixture had passed over the quartz chips and through the 0.7 micron filter, it was passed over a bed of the 1/16" extrudate of $Cu(OH)_2/Al_2O_3$ prepared as described above. Samples of the gas after separation from the condensate taken at regular intervals, were tested for $H_2S$.

The effluent gas gave a negative result when tested for $H_2S$ with lead acetate and $CdSO_4$; neither the black PbS nor the yellow CdS was formed.

The Hg content of the condensate after separation from the acid gas was below about 10 ppb.

Example 1 shows that heating the condensate to 150° C. does not reduce its Hg content. However, Example 2 shows that in the presence of an acid gas composed of $CO_2$ and $H_2S$, Hg is removed from the condensate. Example 3 shows that $Cu(OH)_2$ removes $H_2S$ from the acid gas and further enhances the removal of the Hg from the condensate.

The process of the present invention provides a process for producing a natural gas condensate having a significantly reduced mercury content. The process may be carried out with relatively minor modifications to an existing plant used for the separation and purification of a natural gas wellstream.

We claim:

1. A process for the production of a natural gas condensate having a reduced amount of mercury from a mercury-containing natural gas wellstream comprising the steps of:

separating said wellstream into a gaseous fraction and a liquid fraction, purifying said gaseous fraction with a carbonate solution which has the ability to absorb carbon dioxide and hydrogen sulfide, heating the resulting carbonate solution to expel an acid gas comprising carbon dioxide and hydrogen sulfide, mixing a portion of said acid gas with said liquid fraction, passing said mixture through a filter to remove mercuric sulfide, passing said filtered mixture over a substance capable of removing hydrogen sulfide, and separating said mixture into a first stream comprising light hydrocarbon components and a second stream comprising a natural gas condensate.

2. A process according to claim 1 wherein said mixture is separated in a stabilizer column.

3. A process according to claim 1 wherein said mixing is performed in an inline static mixer.

4. A process according to claim 1 wherein said carbonate solution is an aqueous solution of potassium carbonate.

5. A process according to claim 1 wherein said filter has holes of about ½ micron.

6. A process according to claim 1 wherein said liquid fraction is heated prior to mixing with said portion of said acid gas.

7. A process according to claim 1 wherein the pressure of said portion of said acid gas is increased before said portion of said acid gas is mixed with said liquid fraction.

8. A process according to claim 1 wherein said substance capable of removing hydrogen sulfide comprises a copper hydroxide bed.

9. A process according to claim 8 wherein said copper hydroxide bed comprises copper hydroxide and alumina.

10. A process for the production of a natural gas condensate having a reduced amount of mercury from a mercury-containing natural gas wellstream comprising the steps of:

separating said wellstream into a gaseous fraction and a liquid fraction, purifying said gaseous fraction with a carbonate solution which has the ability to absorb carbon dioxide and hydrogen sulfide, heating the resulting carbonate solution to expel an acid gas comprising carbon dioxide and hydrogen sulfide, increasing the pressure of at least a portion of said acid gas, mixing said increased pressure portion of said acid gas with said liquid fraction, passing said mixture through a filter to remove mercuric sulfide, passing said filtered mixture over a substance capable of adsorbing hydrogen sulfide, and separating said mixture into a first stream comprising light hydrocarbon components and a second stream comprising a natural gas condensate.

11. A process according to claim 10 wherein said mixture is separated in a stabilizer column.

12. A process according to claim 10 wherein said liquid fraction is heated prior to mixing with said increased pressure portion of said acid gas.

13. A process according to claim 10 wherein said mixing is performed in an inline static mixer.

14. A process according to claim 10 wherein said carbonate solution is an aqueous solution of potassium carbonate.

15. A process according to claim 10 wherein said filter has holes of about ½ micron.

16. A process according to claim 10 wherein said substance comprises a copper hydroxide bed.

17. A process according to claim 16 wherein said copper hydroxide bed comprises copper hydroxide and alumina.

18. A process for the production of a natural gas condensate having a reduced amount of mercury from a mercury-containing natural gas wellstream comprising the steps of:

separating said wellstream into a gaseous fraction and a liquid fraction, purifying said gaseous fraction with an aqueous potassium carbonate solution which has the ability to absorb carbon dioxide and hydrogen sulfide, heating the resulting carbonate solution to expel an acid gas comprising carbon dioxide and hydrogen sulfide, increasing the pressure of at least a portion of said acid gas, preheating said liquid fraction, mixing said increased pressure portion of said acid gas with said preheated liquid fraction, passing said mixture through a filter to remove mercuric sulfide, passing said filtered mixture over a substance capable of adsorbing hydrogen sulfide, and separating said mixture in a stabilizer column into a first stream comprising light hydrocarbon components and a second stream comprising a natural gas condensate.

19. A process according to claim 18 wherein said mixing is performed in an inline static mixer.

20. A process according to claim 18 wherein said filter has holes of about ½ micron.

21. A process according to claim 18 wherein said substance comprises a copper hydroxide bed.

22. A process according to claim 21 wherein said copper hydroxide bed comprises copper hydroxide and alumina.

* * * * *